Patented Oct. 25, 1938

2,134,103

UNITED STATES PATENT OFFICE 2,134,103

METHOD OF CONCENTRATING ORES

George L. Collord, Pittsburgh, Pa.

No Drawing. Application March 2, 1937,
Serial No. 128,669

3 Claims. (Cl. 75—1)

This invention relates to the treatment of ores for the beneficiation thereof.

In various of the known deposits of iron ore throughout the world and in particular those of the Missabe Range of the Lake Superior district, there are large bodies of ore which have physical characteristics making them heretofore undesirable or unsatisfactory as sources for the manufacture of pig iron. The Missabe Range contains large deposits of two types of ore which it has hitherto been uneconomical to utilize. The Missabe ores are mainly soft and hydrated hematites and limonite, and they vary in condition from very fine dust to fairly coarse and granular ore and there are also large quantities of so-called sandy ores. The dusty and sandy ores tend to choke up the reducing furnace and they also give rise to large amounts of flue dust. For these reasons they are considered not very attractive as sources for the production of pig iron.

Another type of ore, of which there are large quantities in the Missabe Range particularly, is the very wet or muddy type which has hitherto been considered practically valueless because of the low concentration of iron due to the presence of considerable water. Water or moisture adds to the weight of ore to be transported. Some of the soft ores of the Lake Superior region contain as much as 9% of their weight as hygroscopic water, and some as much as 25%. This moisture content is quite constant under varying weather conditions. Since the moisture is distributed evenly throughout the ore, it does not evaporate readily and the added cost of transporting and handling so much moisture makes these ores very uneconomical. It has been proposed to remove the excess water by sintering, but the cost of so doing is generally prohibitively high.

The prime object of the present invention is to provide for dehydrating such ores or freeing them from the water content thereof in a simple, inexpensive, expeditious and eminently satisfactory manner, so as to reduce the weight of a given amount of ore and thus facilitate the handling, transportation and storage of the treated ore while at the same time putting the ore in a condition for satisfactory and economical reducing in a blast or other reducing furnace.

A further object is to provide for the beneficiation of ores in a manner which is effective not only for the correction of the ores, but which will extend influence and benefits to the reducing operation for the extraction of the desired mineral constituents of the ore.

The invention possesses other objects and features of advantage, some of which, with the foregoing, will be set forth in the following description. In this description, for the purpose of example, there is set forth the best embodiment of the invention now known, but such embodiment is to be regarded as typical only of many possible embodiments, and the invention is not to be limited thereto. The present invention is of particular value in the treatment of certain types of iron ores which have hitherto been considered, because of their physical condition, either impossible of utilization for the extraction of their iron content, or uneconomical for such purpose because of the prohibitive cost of correcting and handling them.

In a broad aspect the treatment herein for wet ores from which the free moisture will not readily evaporate naturally consists in intimately mixing with such ores a water absorbent medium which has an affinity for the water of the ore greater than that of the ore for the water and from which medium water will evaporate. In other words, the ore is treated with a material that will draw the water out of the ore in a manner which may be conveniently referred to as capillary action. The water is then allowed to evaporate from the absorbent medium leaving a relatively dry mixture or agglomeration of dehydrated ore and dried absorbent medium. It is found as a part of the invention, that a highly satisfactory absorbent medium having the above described and other desirable characteristics, is cement, preferably Portland cement.

In practice, there is added to the crude wet ore as it comes from the mine, about 6% by weight of Portland cement. The materials are then thoroughly mixed such as in an ordinary cement mixer or other suitable apparatus, care being taken not to exert any substantial crushing action, and the mixture is then spread out on the ground, floor or other suitable surface in a relatively thin layer. In a shed at ordinary atmospheric temperatures it is found that the material will dry and that a substantial amount of the free or suspended moisture will evaporate in about twenty-four hours. The setting and drying of the material may be hastened by the application of a relatively small amount of heat. It is generally preferable not to heat the mixture above 212° F. and it is found that the most economically satisfactory drying temperature is around 200° F. Heating above 212° F. tends to drive off the water of crystallization, which is not desirable, and may also exert some destructive effect upon the chemical composition of the ore by its converting action upon the hematite, limonite or whatever is the iron mineral contained therein. The ore is composed of particles of various sizes and by the above described operation these particles, large and small, are coated with cement, are hardened and become less pervious to moisture afterwards.

The moisture entrained in these ores seems to have a greater affinity for the ore material than for the air and hence will not readily evaporate naturally from said ore. It is found, however, that the moisture in the ore has a greater affinity for cement than for the ore particles, and when about 6% by weight of Portland cement is thoroughly mixed with the ore, practically all of the free moisture is absorbed by the cement material and it will then readily evaporate from the cement, leaving the ore dehydrated or sufficiently free from water that it may be economically and satisfactorily utilized.

The exact nature of this action and the manner in which the cement treatment causes the free water to be eliminated are not readily understood. It seems obvious that some small portion of the water will be taken up and retained by the cement in the hydration reaction. However, upon hardening, the material will be found to have entirely lost the major portion of its water content and the weight of the material correspondingly decreased. Possibly, this may be due to continuing evaporation of water from adjacent the outside surface of the cement coating of the ore particle accompanied by the consequent ability and strong tendency of the cement to take up from the ore particle more water to replace that lost by evaporation. A noticeable change in the wet ores after the hereindescribed treatment with cement occurs in the physical character or structure of the ore, which is changed from a muddy or plastic condition to a granular form approaching a gravel-like condition. The ore, in its natural condition, is almost like putty whereas, after the cement treatment, it becomes quite granular and the bonding power has been largely removed. It is believed that this change in the physical condition or structure of the ore allows the free water to evaporate in substantial amounts.

The cement surrounds and coats each individual particle of ore and it is not desirable to exert any pressure that will crush or break up these particles since then the cement will not tend to coat them as satisfactorily. Upon drying, the material will be found to be a compact mass of discrete globules having a core of ore and an enveloping film of cement all bonded together by the cement. This material may be readily broken up for transportation to and reducing in the blast furnace.

The above described treatment will remove practically all of the free or suspended water so that the added weight and cost of transporting as much as 25% of the weight of the ore in water is eliminated and the ore is in a hightly satisfactory condition for use in a blast furnace. Furthermore, the 6% by weight of Portland cement which the material carries may take the place of a part of the limestone customarily used as a flux in the furnace. Calcium oxide, the main constituent of Portland cement, has twice the fluxing properties of ordinary limestone which is used in considerable quantities as a flux in treating most ores in the blast furnace. Hence, the treatment of the present invention not only benefits the ore itself by making it more easily and more economically transported, but extends its advantages to the smelting operation and makes possible the use of lesser quantities of basic flux in the blast furnace.

As an example of the concentrating effects of the present method of beneficiation, the following tables are illustrative:

Table 1 represents an analysis of a typical wet and muddy hematite ore or limonite ore carrying 20% by weight of free or suspended water and in which the concentration of $Fe_2O_3$, the desired mineral, is only 57.12%.

Table 2 is an analysis of the dried or set material resulting from the admixture with an ore of the same analysis as shown in Table 1 of 6% by weight of Portland cement. It will be seen that the free moisture has been practically eliminated and the ferric oxide concentration raised 10% to constitute 67.12% and forming a material of manifestly higher grade than the natural ore:

| Table 1 | Per cent by weight | Table 2 | Per cent by weight |
|---|---|---|---|
| $Fe_2O_3$ | 57.12 | $Fe_2O_3$ | 67.12 |
| $SiO_2$ | 8.00 | $SiO_2$ | 9.40 |
| $MnO_2$ | 1.60 | $MnO_2$ | 1.88 |
| $Al_2O_3$ | 6.48 | $Al_2O_3$ | 7.60 |
| Ignition loss | 6.80 | Ignition loss | 8.00 |
| $H_2O$ | 20.00 | Cement | 6.00 |
|  | 100.00 |  | 100.00 |

It will thus be seen that the present invention comprises a method of treatment for the beneficiation and concentration of ores which are difficult of utilization as sources of pig iron because of the presence of excessive amounts of free or suspended water.

What is claimed is:

1. The herein described method of concentrating ores of a muddy or plastic nature which contain undesirable amounts of hygroscopic water and of changing their form to that approaching the granular which comprises, intimately mixing with such ores an amount of Portland cement whereby the major portion of said hygroscopic water is absorbed by the cement, and permitting the water to evaporate from said cement at a temperature not materially in excess of 212° F., thus eliminating a substantial portion of said hygroscopic water and thereby effecting concentration of the ore, and whereby elimination of water and hardening of the cement causes the treated ore to assume a granular condition.

2. The method according to claim 1 in which the amount of cement used is substantially 6% by weight of the amount of ore treated.

3. The method according to claim 1 in which evaporation of the hygroscopic water is assisted by application of heat not materially in excess of 212° F. to the mixture of muddy ore and cement.

GEORGE L. COLLORD.